US007005605B2

(12) United States Patent
Ichihashi et al.

(10) Patent No.: US 7,005,605 B2
(45) Date of Patent: Feb. 28, 2006

(54) LASER IRRADIATION APPARATUS AND METHOD

(75) Inventors: Koki Ichihashi, Toyonaka (JP); Daisuke Yokohagi, Osaka (JP); Daiji Narita, Osaka (JP); Katsuichi Ukita, Mino (JP); Hidehiko Karasaki, Asiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 292 days.

(21) Appl. No.: 10/606,805

(22) Filed: Jun. 27, 2003

(65) Prior Publication Data

US 2004/0084607 A1 May 6, 2004

Related U.S. Application Data

(63) Continuation-in-part of application No. PCT/JP02/09928, filed on Sep. 26, 2002.

(30) Foreign Application Priority Data

Sep. 28, 2001 (JP) ............................ 2001-301713

(51) Int. Cl.
*B23K 26/06* (2006.01)

(52) U.S. Cl. .......................... 219/121.73; 219/121.75; 219/121.78

(58) Field of Classification Search .......... 219/121.73, 219/121.75, 121.74, 121.78
See application file for complete search history.

(56) References Cited

U.S. PATENT DOCUMENTS

| | | | | |
|---|---|---|---|---|
| 3,476,463 | A * | 11/1969 | Kreuzer | 359/717 |
| 5,055,653 | A | 10/1991 | Funami et al. | |
| 5,442,487 | A | 8/1995 | Mizuno | |
| 6,392,742 | B1 * | 5/2002 | Tsuji | 355/67 |
| 6,441,337 | B1 * | 8/2002 | Isaji et al. | 219/121.62 |
| 6,504,652 | B1 * | 1/2003 | Ichihashi et al. | 359/649 |
| 6,721,343 | B1 * | 4/2004 | Kawazoe et al. | 372/38.02 |
| 2002/0109827 | A1 * | 8/2002 | Nishi | 355/53 |

FOREIGN PATENT DOCUMENTS

| | | |
|---|---|---|
| JP | 8-2511 | 1/1996 |
| JP | 2001-121282 | 5/2001 |

* cited by examiner

*Primary Examiner*—M. Alexandra Elve
(74) *Attorney, Agent, or Firm*—Wenderoth, Lind & Ponack, L.L.P.

(57) ABSTRACT

A laser machining apparatus machines a workpiece at uniform intensity by converting a $CO_2$ laser beam to uniform intensity using an intensity-converting element and a phase-matching element. The optical transmission system is configured such that the starting point of the laser beam pointing vector and the exit face of the intensity-converting element are mutually conjugated with respect to the optical transmission system. This structure offers stable machining by ensuring that the laser beam always enters the intensity-converting element at its center, even if the pointing vector of the laser beam shifts.

25 Claims, 9 Drawing Sheets

LASER IRRADIATION APPARATUS AND METHOD

REFERENCE TO RELATED APPLICATION

This is a Continuation-In-Part of International Application PCT/JP02/09928, filed Sep. 26, 2002, which claims convention priority on Japanese Patent Application 2001-301713, filed Sep. 28, 2001, both of which are incorporated by reference herein.

TECHNICAL FIELD

The present invention relates to laser irradiation apparatuses and laser irradiation methods for implementing laser irradiation and laser machining using a coherent beam.

BACKGROUND ART

A conventional laser machining apparatus is described with reference to Japanese Patent Laid-Open Application H8-2511. FIG. 9 illustrates a configuration of the conventional laser machining apparatus.

Laser beam 902A emitted from laser oscillator 901 maintains its parallelism by means of aspherical lenses 903 and 904. In addition, the Gaussian distribution of laser beam 902A with respect to its cross-section is converted to a uniform distribution. Uniform laser beam 902B is first horizontally focused by convex cylindrical lens 905, and then spread. Convex cylindrical lens 906, which has a longer focal length than that of lens 905, produces parallel laser beam 902C which is broadened more horizontally than laser beam 902B. Laser beam 902C enters light-focusing optical apparatus 908 via reflecting mirror 907. Laser beam 902C is then focused by each of plano-convex lenses 911 on light-focusing optical apparatus 908, and finally irradiates target workpiece 909 as several beam spots. Target workpiece 909 is moved using X-Y table 910 to apply necessary machining. The use of aspherical lenses 903 and 904 achieves uniformity of the intensity distribution of laser beam 902A, and allows laser beam 902A to be focused on the plano-convex lenses, and then beam 902A is irradiated on target workpiece 909 in multiple spots. This makes the laser energy density uniform on machining points 912, enabling uniform machining from the center to the periphery.

However, the above laser machining apparatus has the following disadvantage.

During laser machining, laser oscillation conditions are adjusted depending on the size and material of the target workpiece so as to achieve optimal machining conditions. In addition, in some cases, a pulse-oscillated laser beam is emitted to the same position on the target workpiece for several pulses. In this case, machining takes place while changing the laser oscillation conditions for every shot. A pointing vector of laser beam 902A emitted from laser oscillator 901 often changes as a result of changes in the oscillation conditions due to the thermal lens effect of an optical system inside a resonator. In particular, the pointing vector in an unstable resonator typically of a slab laser and a laser oscillator having many optical elements such as a wavelength-converting element inside or outside the resonator often actually changes when the oscillation conditions are changed. If the pointing vector changes due to variations in the oscillation conditions, as described above, a point of the laser beam entering lens 903 shifts. As a result, the uniformity of the intensity distribution of the laser beam exiting from lens 904 breaks down, causing variations in machining among multiple machining spots.

SUMMARY OF THE INVENTION

A laser irradiation apparatus of the present invention includes a light source for producing a coherent beam, a first optical unit disposed in the optical path between the light source and a target workpiece and a second optical unit disposed in the optical path between the first optical unit and the target workpiece. The first optical unit is disposed such that an entry point on the second optical unit and a starting point of a pointing vector of the beam from the light source are mutually conjugated with respect to the first optical unit.

Moreover, the laser irradiation apparatus of the present invention includes a light source for producing a coherent beam, a first optical unit disposed in the optical path between the light source and the target workpiece, a second optical unit disposed in the optical path between the first optical unit and the target workpiece and a third optical unit disposed in the optical path between the second optical unit and the target workpiece. The first optical unit focuses the coherent beam between the first and second optical units, and the second optical unit is disposed such that the focal point and the entry point on the third optical unit are mutually conjugated with respect to the second optical unit.

Further, in a laser irradiation method of the present invention, the coherent beam produced from the light source is irradiated to the target workpiece after being adjusted using the first optical unit and second optical unit. The first optical unit is disposed in the optical path between the light source and the target workpiece. The second optical unit is disposed in the optical path between the first optical unit and the target workpiece. The first optical unit is disposed such that the entry point on the second optical unit and the starting point of the pointing vector of the beam from the light source are mutually conjugated with respect to the first optical unit.

Furthermore, in the laser irradiation method of the present invention, the coherent beam produced from the light source is irradiated to the target workpiece after being adjusted using the first optical unit, second optical unit, and third optical unit. The first optical unit is disposed in the optical path between the light source and the target workpiece. The second optical unit is disposed in the optical path between the first optical unit and the target workpiece. The third optical unit is disposed in the optical path between the second optical unit and the target workpiece. The first optical unit focuses the coherent beam between the first optical unit and second optical unit. The second optical unit is disposed such that its focal point and the entry point on the third optical unit are mutually conjugated with respect to the second optical unit.

DETAILED DESCRIPTION OF THE PREFERRED EMBODIMENTS

First Exemplary Embodiment

Figure 1:
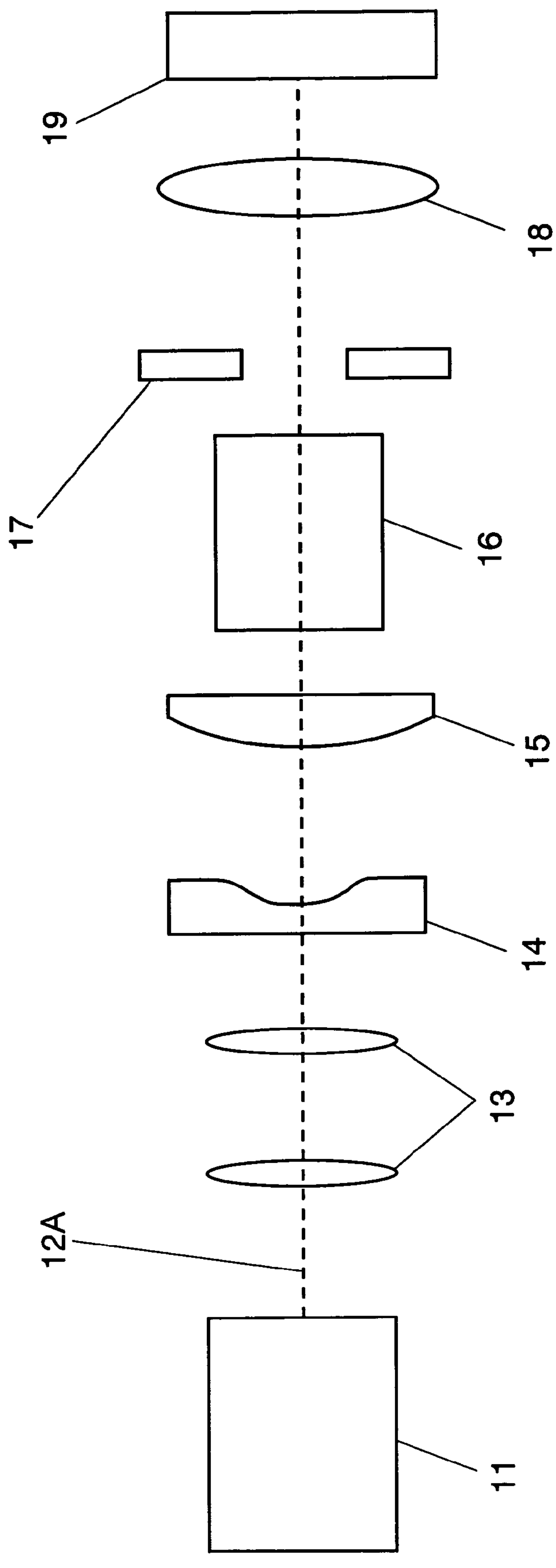
FIG. 1 is a schematic view of a laser machining apparatus in accordance with a first exemplary embodiment of the present invention.

FIG. 1 is a schematic view of a laser machining apparatus in a first exemplary embodiment of the present invention.

$CO_2$ laser beam 12A in TEM00 mode, emitted from $CO_2$ laser oscillator (hereafter referred to as 'oscillator') 11, enters intensity-converting element 14 while optical transmission system 13 adjusts the beam radius to the most appropriate radius for intensity-converting element 14. The intensity distribution of laser beam 12A transmitted through intensity-converting element 14 is changed from a Gaussian distribution to a uniform distribution at phase-matching element 15. The wave surface of laser beam 12A transmitted through phase-matching element 15 becomes planar or spherical without any distortion.

Figure 2A:
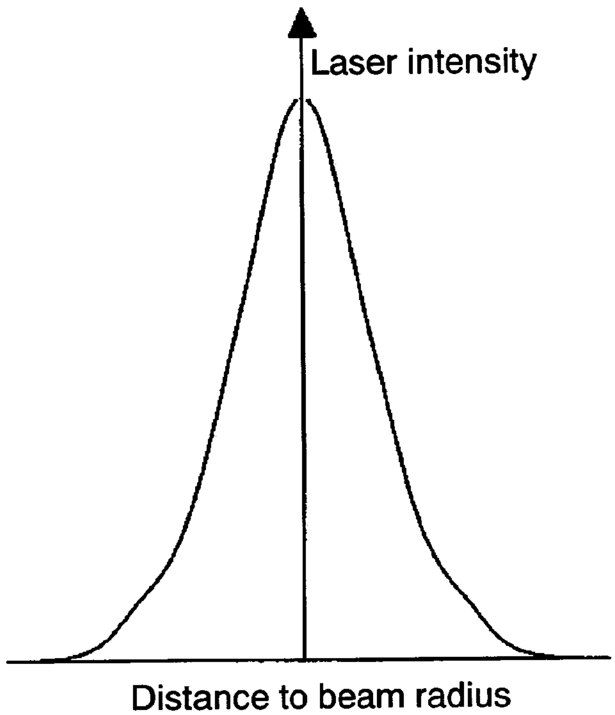
FIGS. 2A and 2B are graphical representations of the intensity distribution of a laser beam in accordance with the first exemplary embodiment of the present invention.
Figure 2B:
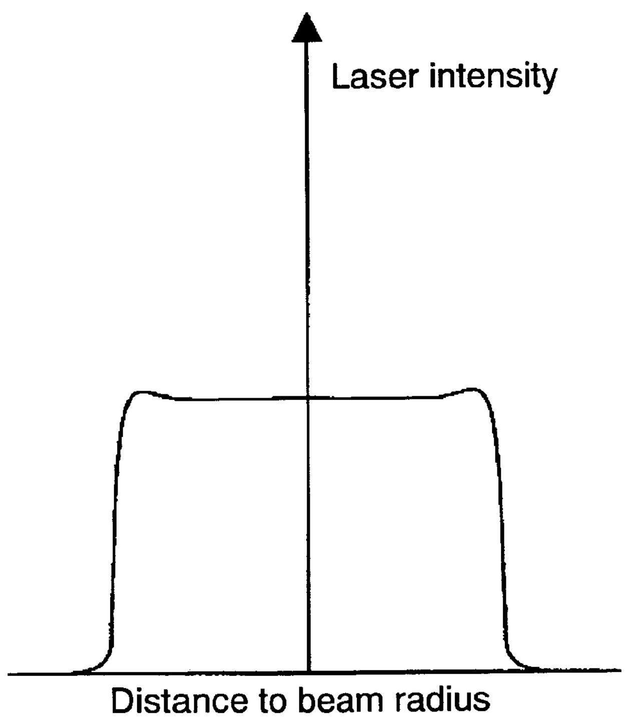

FIG. 2A shows the Gaussian intensity distribution of laser beam 12A on the entry face of intensity-converting element 14. FIG. 2B shows the uniform intensity distribution of laser beam 12A on the exit face of phase-matching element 15.

Laser beam 12A transmitted through phase-matching element 15 further passes through scaling projection optical system 16, and enters mask 17. Scaling projection optical system 16 projects an image at the position of phase-matching element 15 to the position of mask 17. In other words, the position of phase-matching element 15 and the position of mask 17 are conjugated with respect to scaling projection optical system 16. Laser beam 12A, which has a uniform intensity distribution and uniform phase distribution at the position of phase-matching element 15, will lose its uniformity as laser beam 12A spreads, but its intensity distribution becomes uniform again at the position of mask 17, being projected by scaling projection optical system 16. The phase distribution also becomes uniform at mask 17. The projection magnification of scaling projection optical system 16 is variable so that the intensity distribution area of the laser beam on mask 17 is adjustable to the optimal size based on the size of mask 17.

Next, projection lens 18 projects laser beam 12A from an opening of mask 17 to target workpiece 19. Since the positions of mask 17 and target workpiece 19 are conjugated with respect to projection lens 18, the intensity of laser beam 12A is uniformly distributed on target workpiece 19. Since the size of mask 17 is variable, the intensity distribution area of laser beam 12A on target workpiece 19, given by the multiple of the size of mask 17 and projection lens 18, is changed as required. Optical transmission system 13, intensity-converting element 14, phase-matching element 15, scaling projection optical system 16, mask 17, and projection lens 18 are disposed on the optical axis of laser beam 12A without positional deviation or inclination.

Next, the function of optical transmission system 13 is detailed. Laser beam 12A produced from oscillator 11 often changes its pointing vector by changes in oscillation conditions, typically due to the thermal lens effect of an optical system inside oscillator 11. In the case of laser machining in this exemplary embodiment, the laser oscillation conditions are optimized for machining depending on the target workpiece type. In addition, when multiple shots are applied to the same workpiece for machining, the pulse width or repeating frequency is changed depending on the number of shots in some cases.

Figure 3:
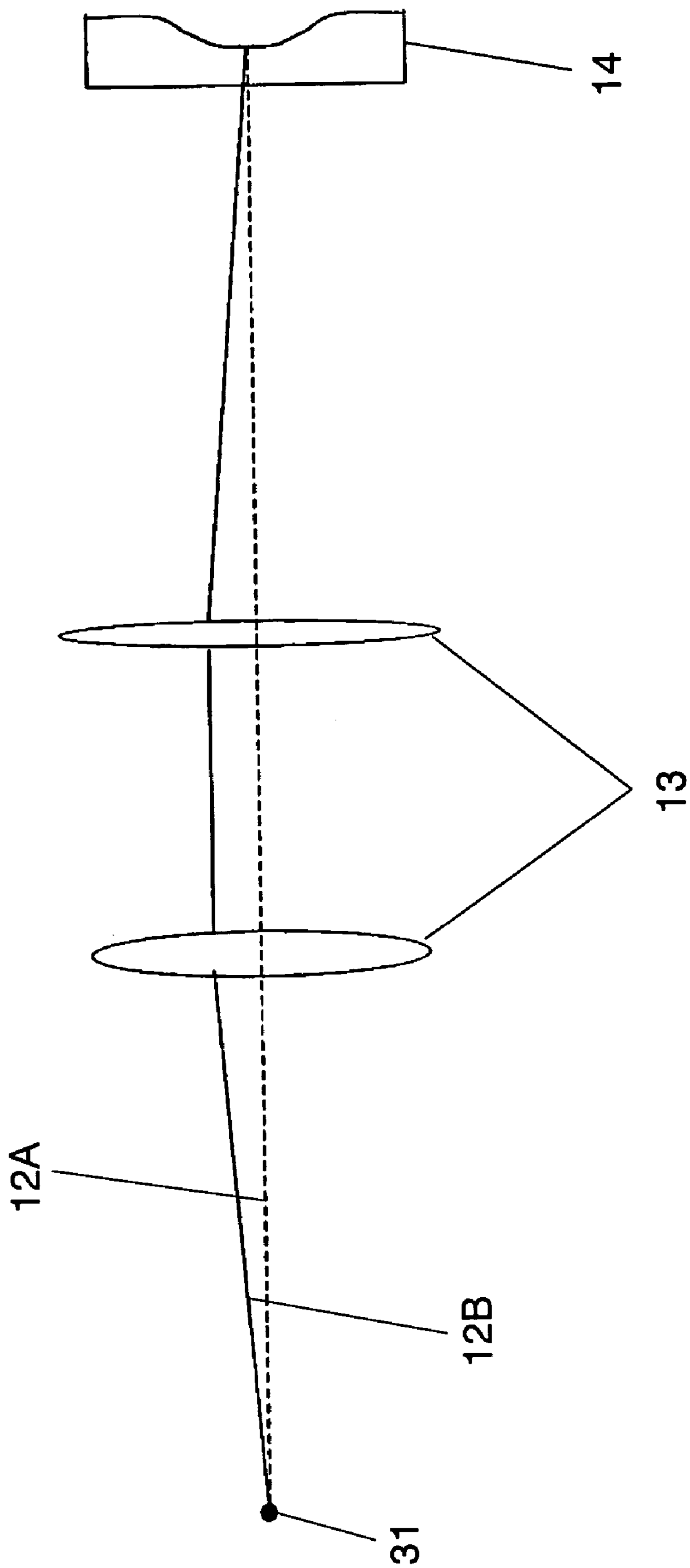
FIG. 3 illustrates a configuration and function of an optical transmission system for the laser beam in accordance with the first exemplary embodiment of the present invention.

FIG. 3 illustrates the case when the pointing vector of the laser beam is shifted.

In this Figure, the pointing vector shifts to form a profile of laser beam 12B. Here, starting point 31 of the pointing vector of laser beam 12A and the exit face of intensity-converting element 14 are mutually conjugated with respect to optical transmission system 13. In other words, optical transmission system 13 is disposed such that the image at the starting point of the pointing vector of laser beam 12A is projected on the exit face of intensity-converting element 14. The configuration of optical transmission system 13 at this position enables the laser beam to always enter at the center of intensity-converting element 14 even though the pointing vector of the laser beam shifts, such as to laser beam 12B.

Figure 4:
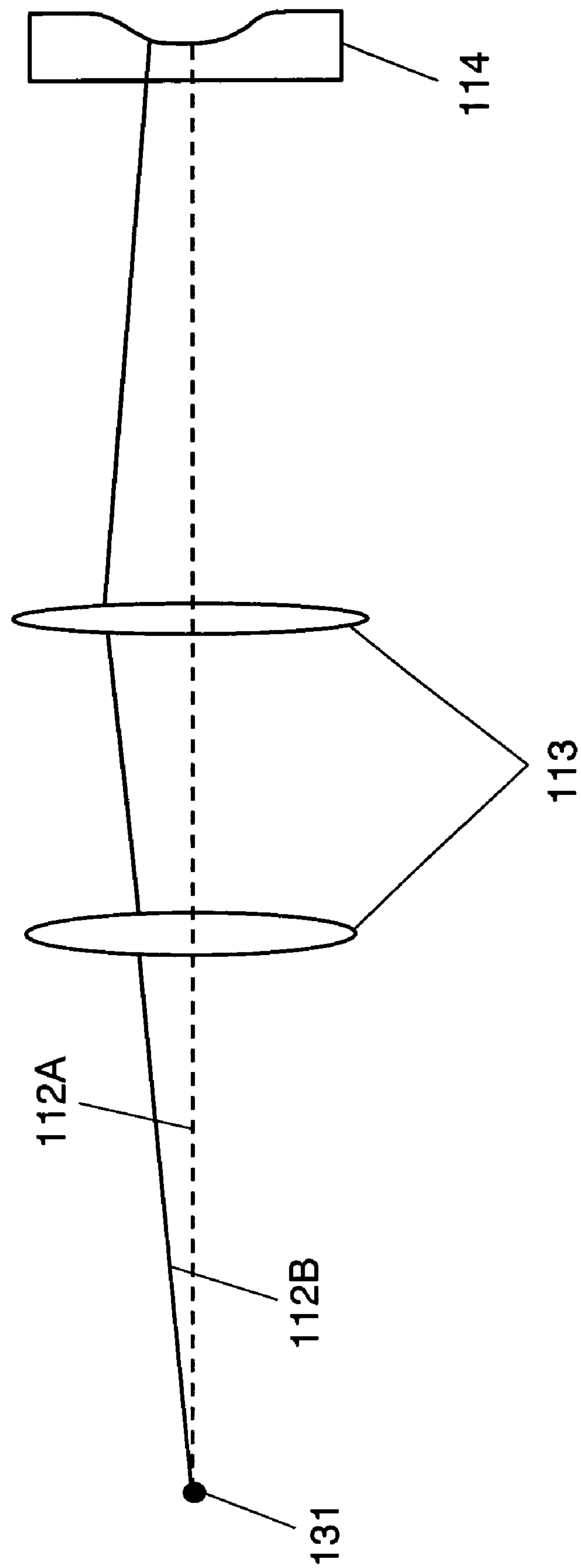
FIG. 4 illustrates behavior of the laser beam in a conventional configuration.
Figure 5:
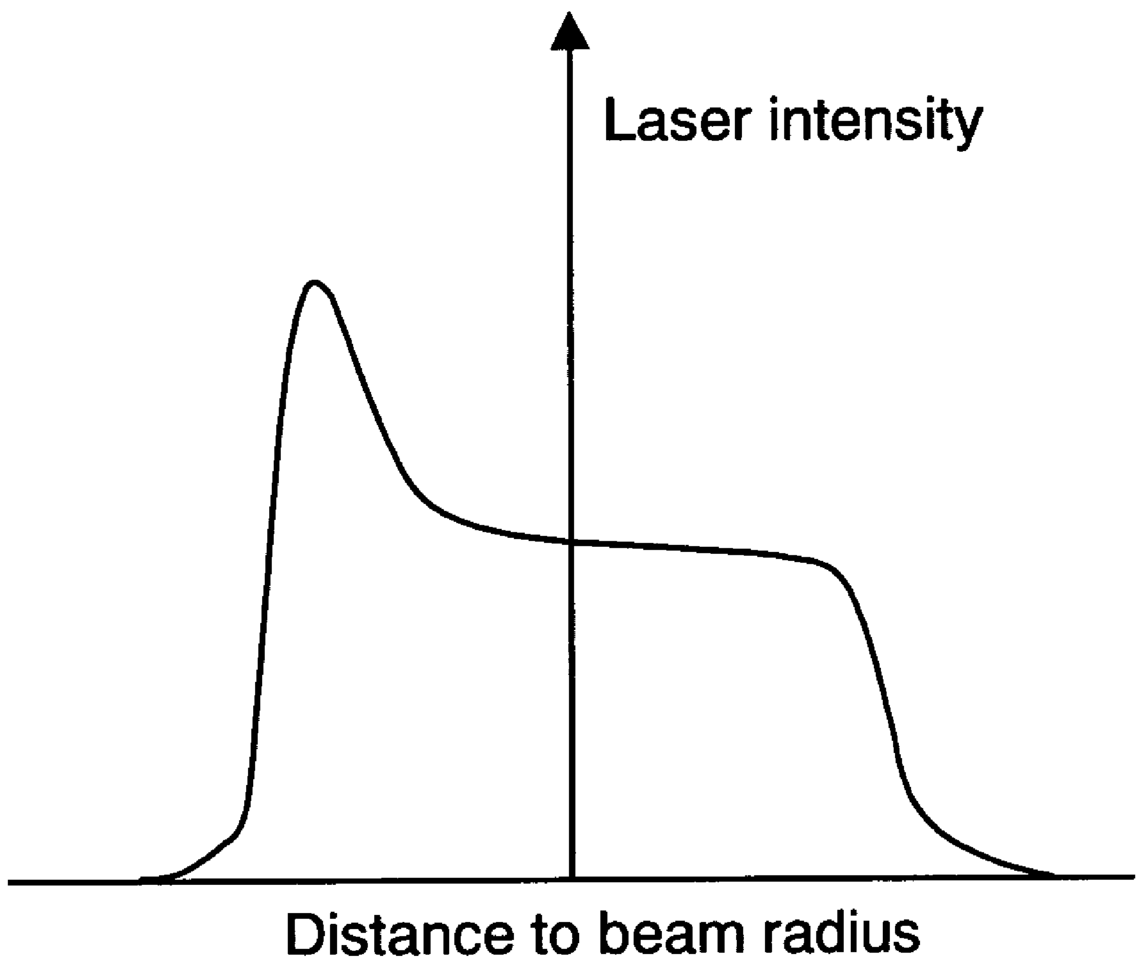
FIG. 5 is a graphical representation of the intensity distribution of a laser beam at the position of a phase-matching element in the conventional configuration.

FIG. 4 shows an example of the prior art in which optical transmission system 113 is disposed such that starting point 131 of the pointing vector and the exit face of intensity-converting element 114 are not conjugated. In this case, laser beam 112B does not enter at the center of intensity converting element 114. If the entry point of the laser beam is out of the center of intensity-converting element 114, and this configuration is applied to the laser machining apparatus shown in FIG. 1, the uniform intensity distribution on the exit face of phase-matching element 15 degrades, as shown in FIG. 5.

Accordingly, in this exemplary embodiment, optical transmission system 13 is disposed such that an image at starting point 31 of the pointing vector of laser beam 12A is projected on intensity-converting element 14. This allows the laser beam always to enter at the center of intensity-converting element 14 even if the pointing vector of the laser beam shifts, such as to laser beam 12B, enabling the laser beam distribution to always be converted to a uniform intensity distribution.

Second Exemplary Embodiment

Figure 6:
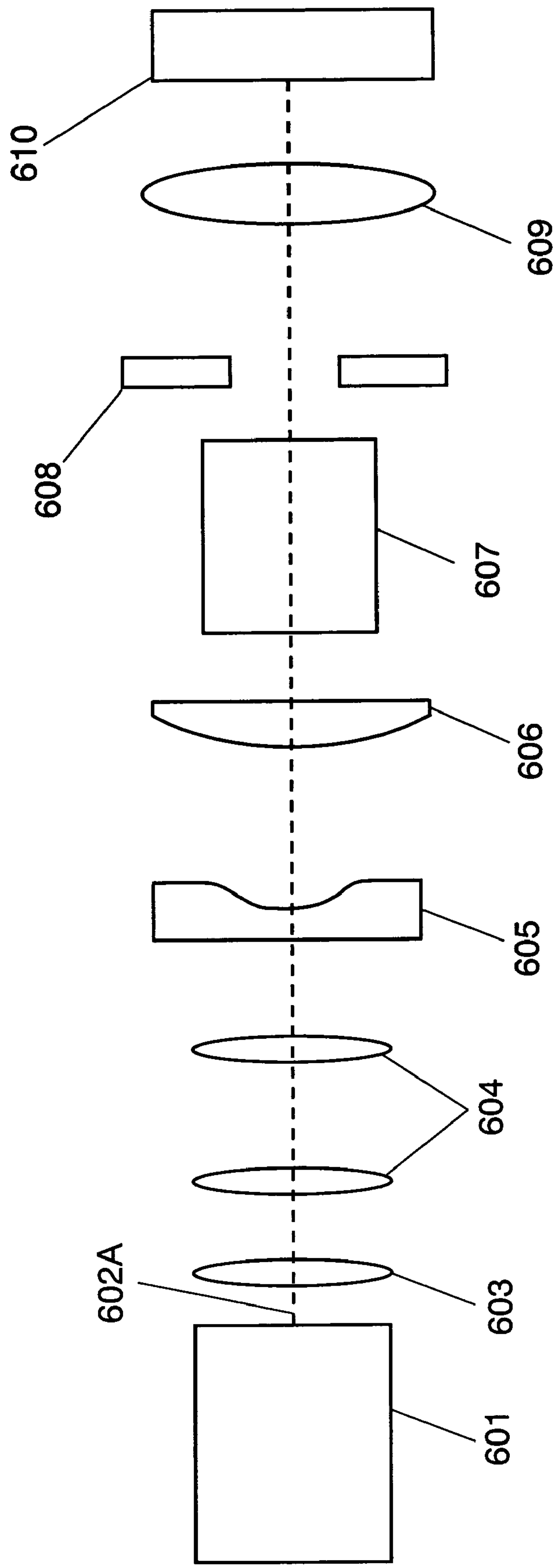
FIG. 6 is a schematic view of a laser machining apparatus in accordance with a second exemplary embodiment of the present invention.

FIG. 6 is a schematic view of a laser machining apparatus in a second exemplary embodiment of the present invention.

$CO_2$ laser beam 602A in TEM00 mode, emitted from $CO_2$ laser oscillator (hereafter referred to as 'oscillator') 601, enters intensity-converting element 605 while light-focusing optical system 603 and optical transmission system 604 adjust the beam radius. The intensity distribution of laser beam 602A transmitted through intensity-converting element 605 is changed from a Gaussian distribution to a uniform distribution at the position of phase-matching element 606. The wave surface of laser beam 602A transmitted through phase-matching element 606 becomes planar or spherical.

The Gaussian distribution of laser beam 602A on the entry face of intensity-converting element 605 and uniform distribution of laser beam 602A on the exit face of phase-matching element 606 are the same as those shown in FIGS. 2A and 2B in the first exemplary embodiment.

Laser beam 602A transmitted through phase-matching element 606 further passes through scaling projection optical system 607, and enters mask 608. Scaling projection optical system 607 projects an image at the position of phase-matching element 606 on the position of mask 608. In other words, the position of phase-matching element 606 and the position of mask 608 are conjugated with respect to scaling projection optical system 607. Laser beam 602A, which has a uniform intensity distribution and uniform phase distribution at the position of phase-matching element 606, will lose its uniformity as laser beam 602A spreads, but its intensity distribution becomes uniform again at the position of mask 608, being projected by scaling projection optical system 607. The phase distribution also becomes uniform at mask 608. The projection magnification of scaling projection optical system 607 is variable so that the intensity distribution area of the laser beam on mask 608 is adjustable to the optimal size based on the size of mask 608.

Next, projection lens 609 projects laser beam 602A at an opening of mask 608 on target workpiece 610. Since the positions of mask 608 and target workpiece 610 are conjugated with respect to projection lens 609, the intensity of laser beam 602A is uniformly distributed on target workpiece 610. Since the size of mask 608 is variable, the intensity distribution area of laser beam 602A on target workpiece 610, given by the multiple of the size of mask 608 and projection lens 609, is changed as required. Light-focusing optical system 603, optical transmission system 604, intensity-converting element 605, phase-matching element 606, scaling projection optical system 607, mask 608, and projection lens 609 are disposed on the optical axis of laser beam 602A without positional deviation or inclination.

Next, the function of light-focusing optical system 603 and optical transmission system 604 is detailed. Laser beam 602A produced from oscillator 601 often changes its pointing vector by changes in oscillation conditions, typically due to the thermal lens effect of an optical system inside oscillator 601. In the case of laser machining in this exemplary embodiment, the laser oscillation conditions are optimized for machining depending on the target workpiece type. In addition, when multiple shots are applied to the same workpiece for machining, the pulse width or repeating frequency is changed depending on the number of shots in some cases.

Figure 7:
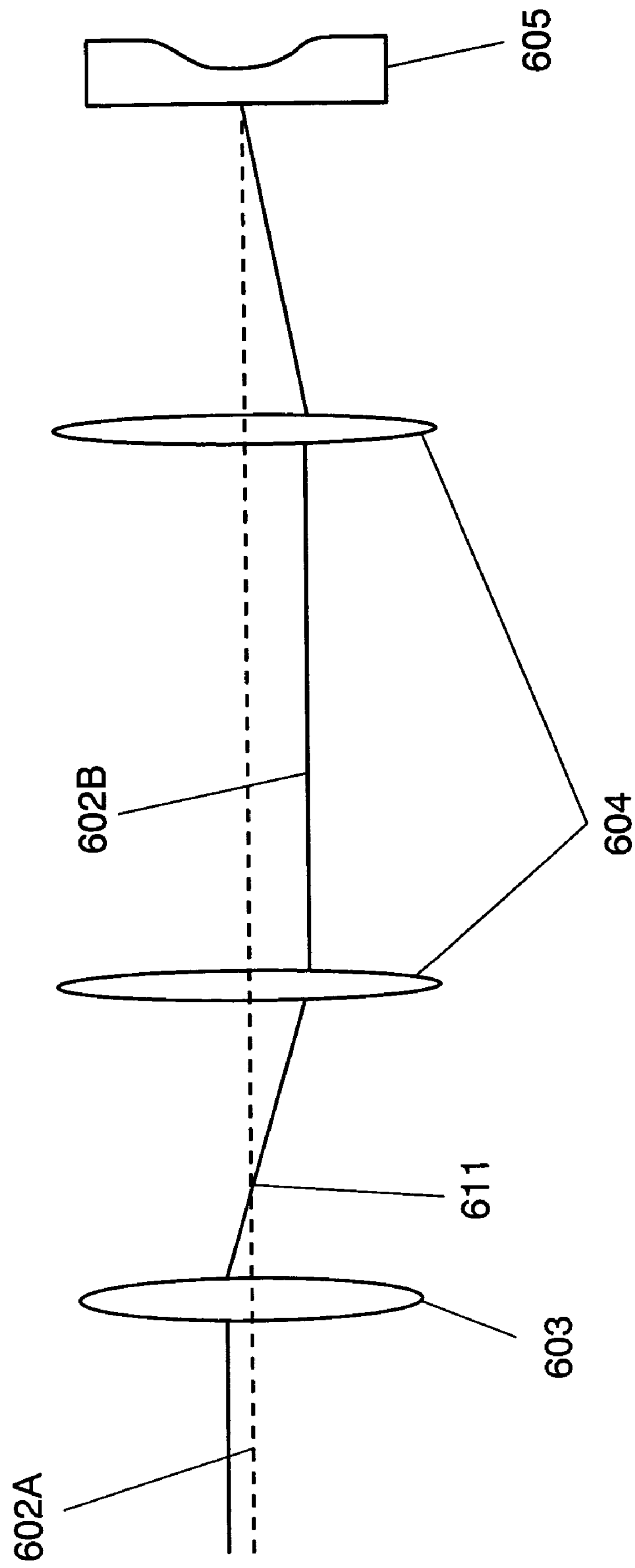
FIG. 7 illustrates a configuration and function of an optical transmission system for the laser beam in accordance with the second exemplary embodiment of the present invention.

FIG. 7 shows the case when the pointing vector of laser beam 602A is shifted.

Laser beam 602B adopts the state shown in the Figure due to shifting of the pointing vector. Light-focusing optical system 603 converges laser beam 602A or laser beam 602B between light-focusing optical system 603 and optical transmission system 604. Optical transmission system 604 projects the laser beam at this focal point 611 on the exit face of intensity converting element 605. In other words, focal point 611 and the exit face of intensity-converting element 605 are conjugated with respect to optical transmission system 604. The projection magnification of the optical system consisting of light-focusing optical system 603 is determined such as to achieve a predetermined beam radius for the laser beam entering intensity-converting element 605.

As shown in FIG. 7, when the starting point of the pointing vector of the laser beam is at an infinite point with respect to the laser oscillator, the pointing vector shifts in parallel. In this case, the use of light-focusing optical system 603 and optical transmission system 604 in this exemplary embodiment makes the laser beam enter at the center of intensity-converting element 605 even though the pointing vector of the laser beam is shifted in parallel.

Figure 8:
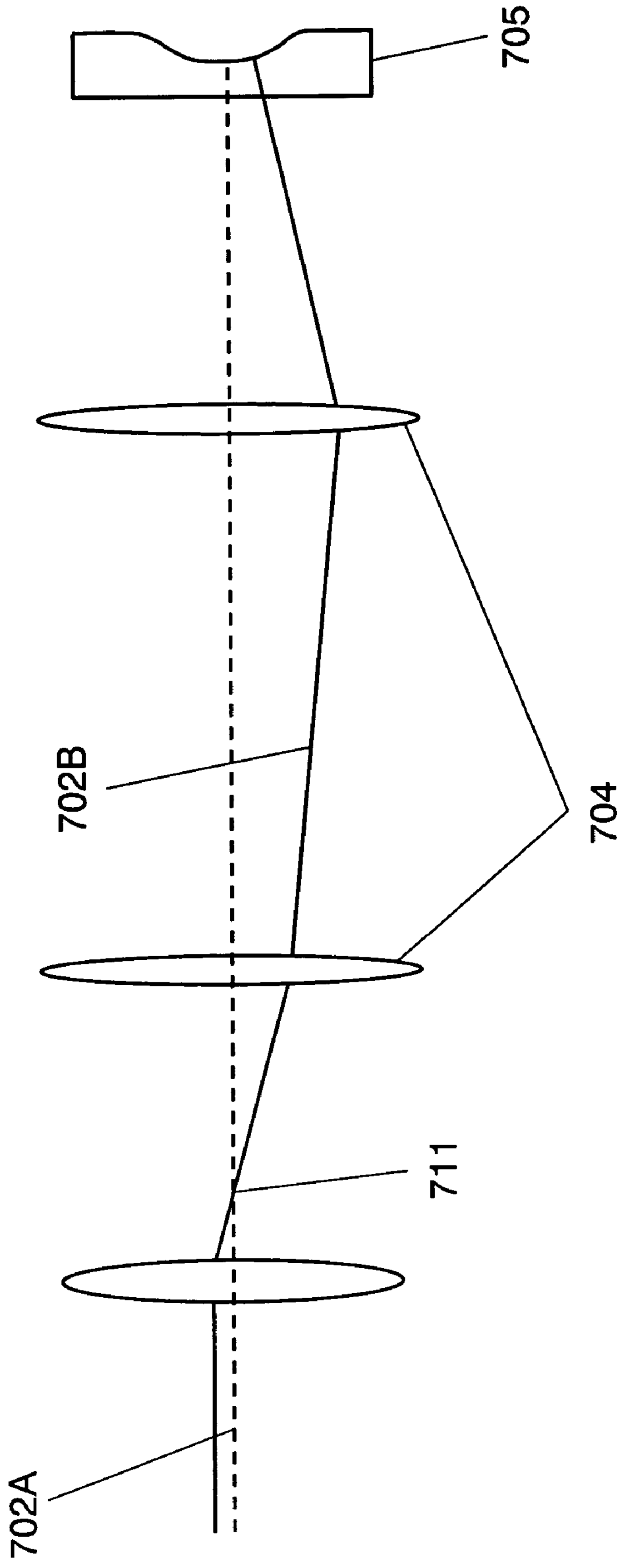
FIG. 8 illustrates behavior of the laser beam in the conventional configuration.
Figure 9:
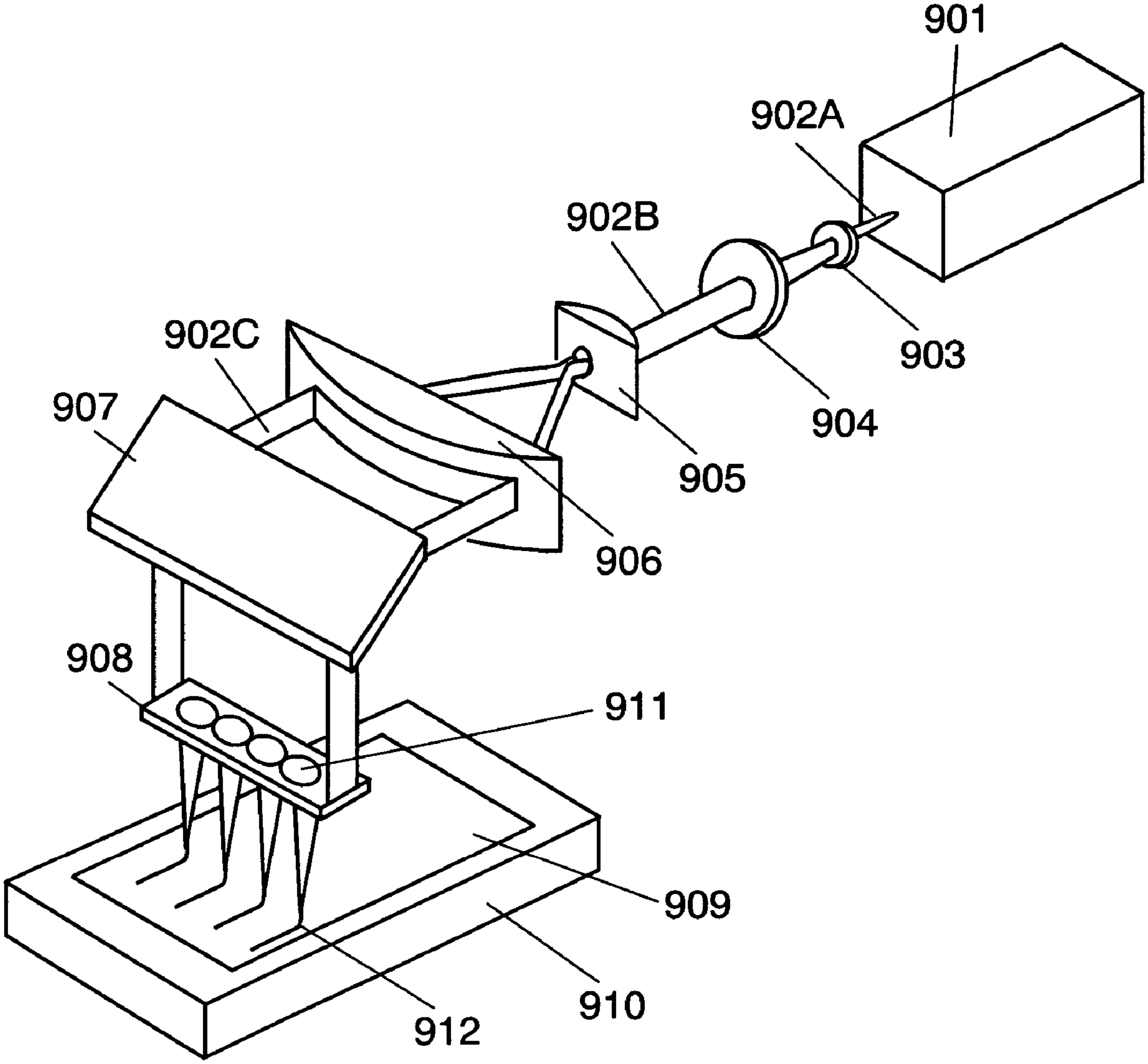
FIG. 9 is a schematic view of a conventional laser machining apparatus.

FIG. 8 is an example of the prior art when focal point 711 and the exit face of intensity-converting element 705 are not conjugated with respect to optical transmission system 704. In this case, laser beam 702B does not enter at the center of intensity-converting element 705. When the entry point of the laser beam entering intensity-converting element 705 is shifted from the center of the intensity-converting element, and this configuration is applied to the laser machining apparatus shown in FIG. 6, the uniform intensity distribution on the exit face of phase-matching element 606 degrades, which is the same as in FIG. 5 in the explanation of the first exemplary embodiment. Accordingly, in the second exemplary embodiment, light-focusing optical system 603 and optical transmission system 604 are employed for focusing laser beam 602A between light-focusing optical system 603 and optical transmission system 604, and optical transmission system 604 projects the laser beam at this focal point 611 on the exit face of intensity-converting element 605. This allows the laser beam always to enter at the center of intensity-converting element 605 even if the pointing vector of the laser beam shifts, such as to laser beam 602B, enabling to the laser beam distribution to be converted to a uniform intensity distribution.

The laser beam described in the exemplary embodiments is a $CO_2$ laser beam. However, the present invention is also applicable to other beams suitable for use in machining such as YAG laser and He—Ne laser beams.

The laser irradiation apparatuses which convert the laser beam distribution to a uniform intensity distribution and implement laser irradiation for machining can achieve a continuing high quality of machining with one of the configurations as below, even if the pointing vector of the laser beam shifts:

A) An optical transmission system is disposed such that the entry point of an intensity-converting element and the starting point of a pointing vector of a laser beam are mutually conjugated with respect to the optical transmission system.

B) A light-focusing optical system converges a coherent beam between the light-focusing optical system and an optical transmission system. The optical transmission system is disposed such that the focal point of the optical transmission system and the entry point of an intensity converting element are mutually conjugated with respect to the optical transmission system.

We claim:

1. A laser irradiation apparatus comprising:

a light source for producing a coherent beam;

a first optical unit disposed in an optical path between said light source and a target workpiece to initially receive the coherent beam from said light source; and a second optical unit disposed in an optical path between said first optical unit and the target workpiece to receive the coherent beam from said first optical unit, wherein said first optical unit is disposed such that a starting point of a pointing vector of the coherent beam from said light source and an exit face on said second optical unit are mutually conjugated with respect to said first optical unit.

2. The laser irradiation apparatus as defined in claim 1, wherein said second optical unit is an optical beam forming unit.

3. The laser irradiation apparatus as defined in claim 2, wherein said optical beam forming unit is an optical element for making an intensity distribution of the coherent beam uniform.

4. The laser irradiation apparatus as defined in claim 1, wherein said first optical unit comprises at least two lenses.

5. The laser irradiation apparatus as defined in claim 1, wherein said light source is a laser oscillator.

6. The laser irradiation apparatus as defined in claim 1, further comprising at least a third optical unit in an optical path between said second optical unit and the target workpiece.

7. A laser irradiation apparatus comprising:

a light source for producing a coherent beam;

a first optical unit disposed in an optical path between said light source and a target workpiece to initially receive the coherent beam from said light source;

a second optical unit disposed in an optical path between said first optical unit and the target workpiece to receive the coherent beam from said first optical unit; and a third optical unit disposed in an optical path between said second optical unit and the target workpiece to receive the coherent beam from said second optical unit, wherein said first optical unit focuses the coherent beam between said first optical unit and said second optical unit, and a focal point of said second optical unit and an exit face on said third optical unit are mutually conjugated with respect to said second optical unit.

8. The laser irradiation apparatus as defined in claim 7, wherein said third optical unit is an optical beam forming unit.

9. The laser irradiation apparatus as defined in claim 8, wherein said optical beam forming unit is an optical element for making an intensity distribution of the coherent beam uniform.

10. The laser irradiation apparatus as defined in claim 9, wherein said second optical unit comprises at least two lenses.

11. The laser irradiation apparatus as defined in claim 9, wherein said light source is a laser oscillator.

12. The laser irradiation apparatus as defined in claim 9, further comprising at least a fourth optical unit in an optical path between said third optical unit and the target workpiece.

13. A laser irradiation method comprising;

producing a coherent beam with a light source;

adjusting the coherent bean using a first optical unit and a second optical unit, the first optical unit being disposed in an optical path between the light source and the target workpiece to initially receive the coherent beam from the light source, and the second optical unit being disposed in an optical path between the first optical unit and the target workpiece to receive the coherent beam from the first optical unit; and irradiating the coherent beam to the target workpiece, wherein the first optical unit is disposed such that a starting point of a pointing vector of the coherent beam from the light source and an exit face on the second optical unit are mutually conjugated with respect to the first optical unit.

14. The laser irradiation method as defined in claim 13, wherein the second optical unit is an optical beam forming unit.

15. The laser irradiation method as defined in claim 14, wherein the optical beam forming unit is an optical element for making an intensity distribution of the coherent beam uniform.

16. The laser irradiation method as defined in claim 13, wherein the first optical unit comprises at least two lenses.

17. The laser irradiation method as defined in claim 13, further comprising adjusting the coherent beam using at least a third optical unit disposed in an optical path between the second optical unit and the target workpiece.

18. The laser irradiation method as defined in claim 13, wherein said irradiating of the coherent beam to the target workpiece laser-machines the target workpiece.

19. A laser irradiation method comprising:

producing a coherent beam with a light source;

adjusting the coherent beam using a first optical unit, a second optical unit, and a third optical unit, the first optical unit being disposed in an optical path between the light source and the target workpiece to initially receive the coherent beam from the light source, the second optical unit being disposed in an optical path between the first optical unit and the target workpiece to receive the coherent beam from the first optical unit, and the third optical unit being disposed in an optical path between the second optical unit and the target workpiece; and irradiating the beam to the target workpiece, and wherein said adjusting of the coherent beam includes focusing the coherent beam between the first optical unit and the second optical unit using the first optical unit, and wherein a focal point of the second optical unit and an exit face on the third optical unit are mutually conjugated with respect to the second optical unit.

20. The laser irradiation method as defined in claim 19, wherein the third optical unit is an optical beam forming unit.

21. The laser irradiation method as defined in claim 20, wherein the optical beam forming unit is an optical element for making an intensity distribution of the coherent beam uniform.

22. The laser irradiation method as defined in claim 19, wherein the second optical unit comprises at least two lenses.

23. The laser irradiation method as defined in claim 19, wherein the light source is a laser oscillator.

24. The laser irradiation method as defined in claim 19, further comprising adjusting the coherent beam using at least a fourth optical unit disposed in an optical path between the third optical unit and the target workpiece.

25. The laser irradiation method as defined in claim 19, wherein said irradiating of the target workpiece laser-machines the target workpiece.

* * * * *

UNITED STATES PATENT AND TRADEMARK OFFICE

CERTIFICATE OF CORRECTION

PATENT NO. : 7,005,605 B2
APPLICATION NO. : 10/606805
DATED : February 28, 2006
INVENTOR(S) : Koki Ichihashi et al.

It is certified that error appears in the above-identified patent and that said Letters Patent is hereby corrected as shown below:

IN THE CLAIMS

Column 7, line 47, please replace “coherent bean” to --coherent beam--.

Signed and Sealed this

Ninth Day of January, 2007

JON W. DUDAS

*Director of the United States Patent and Trademark Office*